United States Patent [19]
D'Amico et al.

[11] Patent Number: 5,797,657
[45] Date of Patent: Aug. 25, 1998

[54] TRUCK WITH RETRACTABLE CANOPY

[75] Inventors: John A. D'Amico; Ted M. Atchley, both of Casper, Wyo.

[73] Assignee: Western Technology Services International, Inc., Casper, Wyo.

[21] Appl. No.: 804,581

[22] Filed: Feb. 24, 1997

[51] Int. Cl.$^6$ ................................................. B60P 1/28
[52] U.S. Cl. .................. 298/17 R; 298/1 R; 414/914; 296/184
[58] Field of Search ......................... 298/1 C, 1 R, 298/17 R, 23 C; 414/914; 280/789; 180/89.12, 89.19; 296/184, 190

[56] References Cited

U.S. PATENT DOCUMENTS

| | | | |
|---|---|---|---|
| 3,168,345 | 2/1965 | Roberts et al. | 298/23 C |
| 3,472,548 | 10/1969 | Comisac | 298/23 C |
| 4,071,277 | 1/1978 | Stedman | 298/22 P |
| 4,116,486 | 9/1978 | Duttarer | 298/17 R |
| 4,425,002 | 1/1984 | Coleman et al. | 296/184 |
| 4,531,781 | 7/1985 | Hunt et al. | 296/184 |
| 5,072,485 | 12/1991 | Young et al. | 414/914 |
| 5,281,074 | 1/1994 | Mashuda | 414/914 |
| 5,516,135 | 5/1996 | Christenson | 298/1 R |
| 5,520,442 | 5/1996 | Kisami et al. | 298/17 R |

*Primary Examiner*—Karen M. Young
*Assistant Examiner*—Douglas Hess
*Attorney, Agent, or Firm*—Thompson & Knight, P.C.

[57] ABSTRACT

A truck includes a chassis with a body movably mounted to the chassis behind a cab. The body is movable between a first position generally parallel to the chassis and a second generally upright position with respect to the chassis. A canopy is movably mounted to the body. The canopy is movable between an extended position and a retracted position. In the extended position, the canopy extends outwardly from the body to cover the cab when said body is in the first position. The canopy is retractable to decrease the overall height of the truck when the body is in the generally upright second position.

25 Claims, 3 Drawing Sheets

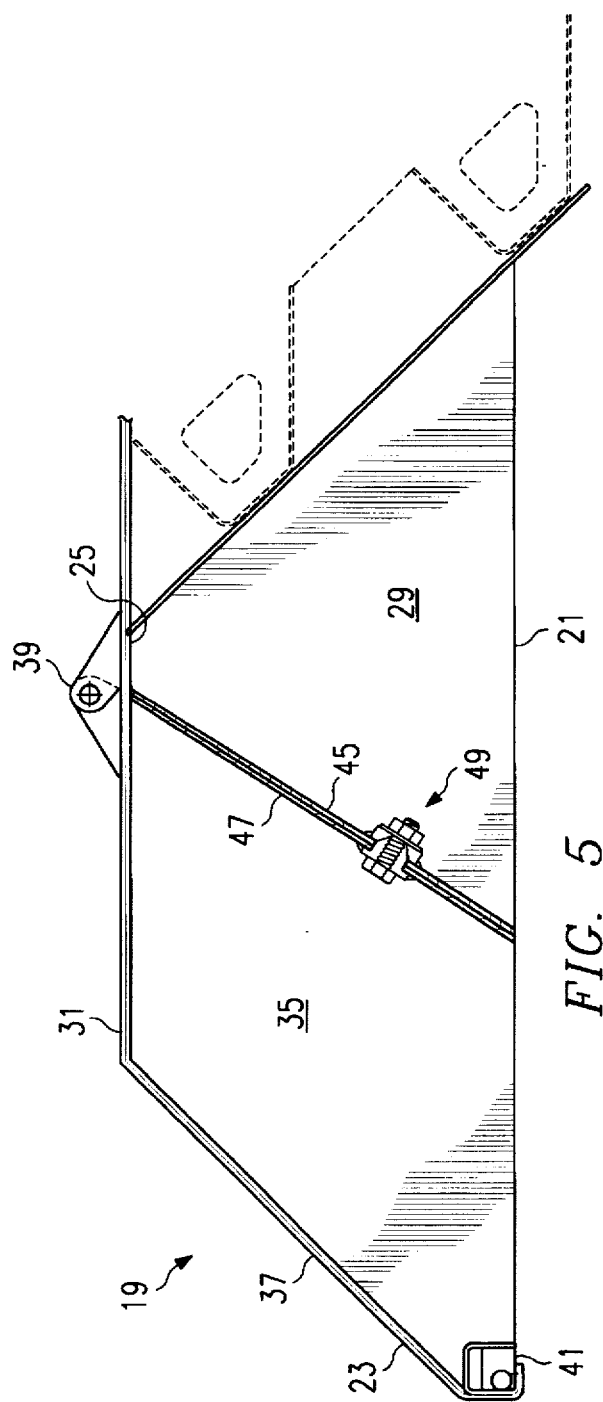
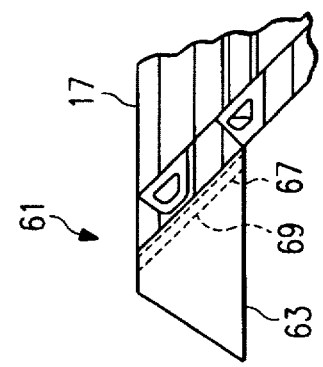
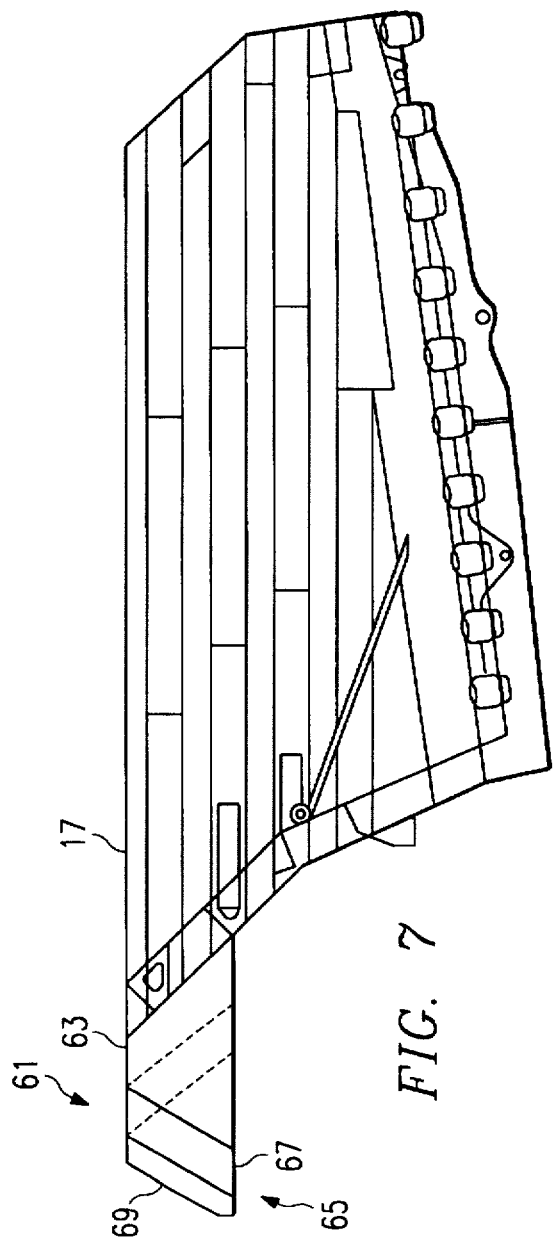

5,797,657

1

TRUCK WITH RETRACTABLE CANOPY

FIELD OF THE INVENTION

The present invention relates generally to trucks, and more particularly to a dump-type truck with a movable body and a canopy for shielding the cab of the truck during loading, wherein the canopy is retractable in order to decrease the overall height of the truck when the body is in a generally upright position.

DESCRIPTION OF THE PRIOR ART

All current truck bodies for large off-highway, rigid frame trucks have a canopy that is attached to the front of the body and moves with the body. The canopy protects the cab and the front of the chassis from damage from debris or material being loaded into the body of the truck.

These trucks are extremely large. Accordingly, the canopy extend a great distance forward to cover the cab and forward end of the chassis. When the body is raised to the dumping position, the canopy extends a great distance vertically. In normal operation, when the trucks are hauling and dumping material, the great overall height of the truck is not a problem. However, when a large truck is taken into a shop for service, there may be insufficient clearance to allow the body to be raised. In some cases, overhead shop cranes may not be high enough to clear the canopy when the body is in the raised position. In other cases, the actual roof or ceiling clearance may be insufficient to allow the body to be raised in the shop.

Shops are built to accommodate trucks in existence at the time the shop is built. But as truck technology improves, manufacturers build larger trucks. As trucks are made larger and larger, the problem of insufficient overhead clearance becomes more common. Accordingly, it is an object of the present invention to provide a truck with a canopy that shields the cab but has a decreased overall height when the truck body is in the upright position.

SUMMARY OF THE INVENTION

Briefly stated, the truck of the present invention includes a chassis with a body movably mounted to the chassis behind a cab. The body is movable between a first position generally parallel to the chassis and a second generally upright position with respect to the chassis. A canopy is movably mounted to the body. The canopy is movable between an extended position and a is retracted position. In the extended position, the canopy extends outwardly from the body to cover the cab when the body is in the first position. The canopy is retractable to decrease the overall height of the truck when the body is in the generally upright second position.

In one embodiment of the present invention, the canopy is hingedly mounted to the body. In an alternative embodiment, the canopy is telescopingly mounted to the body. In either embodiment, the canopy preferably includes an attachment member fixedly connected to the body, and a movable member movably mounted with respect to the attachment member. The attachment member includes a pair of spaced apart sides with a top plate connected therebetween. The movable member includes a pair of spaced apart sides with a top plate connected therebetween. The movable member may also include a forwardly and downwardly sloping front plate. Means are provided for releasably locking the canopy in the extended position.

In the hinged embodiment of the present invention, the movable member includes a back plate connected between the sides thereof. The attachment member includes a front plate connected between its sides. The front plate of the attachment member engages the back plate of the movable member when the canopy is in the extended position.

In the hinged embodiment, the releasable locking means includes a tapered male member attached to one of the front and back plates, and a tapered female member in the other of the front and back plates. The male and female members each have a bolt hole axially formed therein. The male and female members are positioned to matingly engage each other when the canopy is in the extended position. The male and female members are held together by a bolt connected through their respective bolt holes.

BRIEF DESCRIPTION OF THE DRAWINGS

FIG. 5 is a partial sectional view taken along line 5—5 of FIG. 3.

FIG. 7 is a side view of an alternative embodiment of the canopy of the present invention in the extended position.

FIG. 8 is a partial side view of the canopy of the FIG. 7 in the retracted position.

DESCRIPTION OF THE PREFERRED EMBODIMENT

Figure 1:
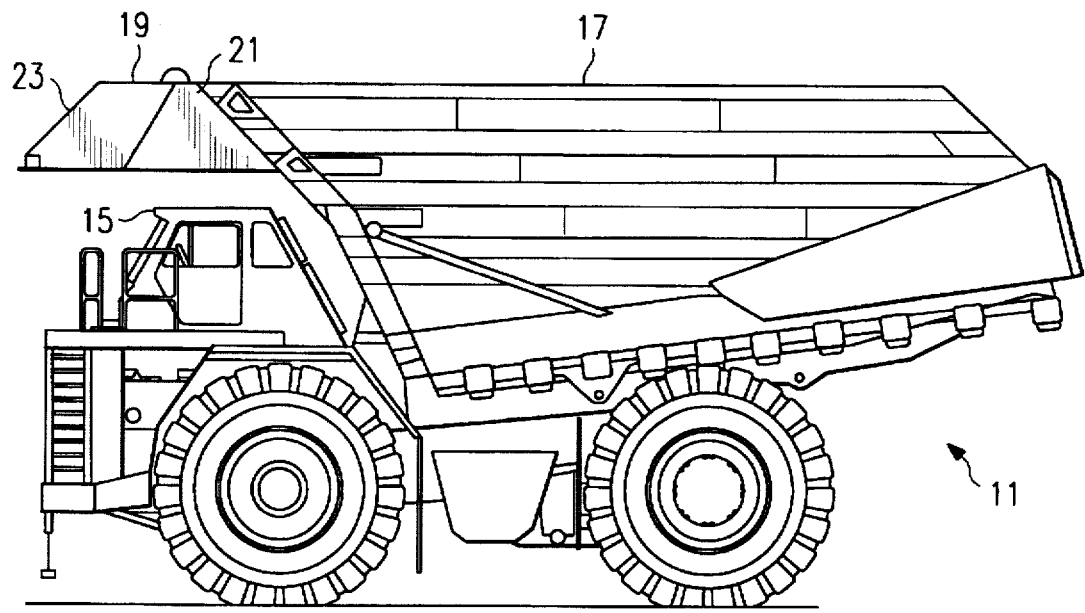
FIG. 1 is a side view of the truck of the present invention with the body in the first position and the canopy in the extended position.
Figure 2:
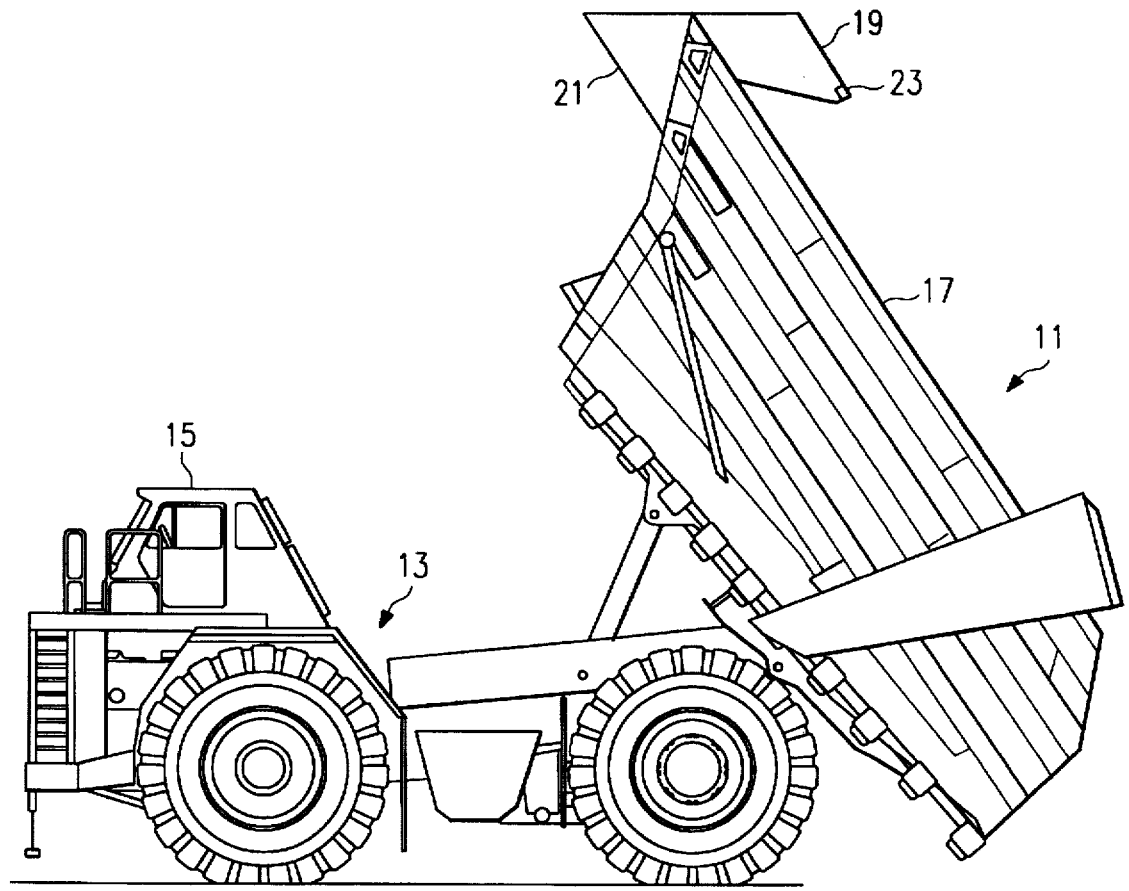
FIG. 2 is a side view of the truck of the present invention with the body in the second position and the canopy in the retracted position.

Referring now to the drawings, and first to FIGS. 1 and 2, the truck of the present invention is designated generally by the numeral 11. In the preferred embodiment, truck 11 is a large self propelled off-highway vehicle capable of carrying hundreds of tons of material in operations such as mining, and the like. Truck 11 includes a chassis, designated generally by the numeral 13. Chassis 13 carries a cab 15 at its forward end and a boxlike load carrying body 17 at its rearward end. Body 17 is moveable between a first position generally parallel to chassis 13, as shown in FIG. 1, and a second, generally upright position, as shown in FIG. 2.

As shown in FIG. 1, truck 11 includes a canopy 19 that extends outwardly from body 17 when body 17 is in the first position. Canopy 19 extends past the forward end of truck 11 and it serves to shield cab 15 and the forward end of truck 11 from debris during the loading of body 17. Canopy 19 includes an attachment member 21 that is fixedly connected to body 17, and a moveable member 23 that is hingedly connected to attachment member 21. Thus, moveable member 23 can be folded back to a position as shown in FIG. 2.

In normal operation, moveable member 23 is locked to attachment member 21 in a manner that will be described in detail hereinafter. When body 17 is raised to dump a load of material, canopy 19 remains in the extended position. However, if it is necessary to service truck 11 in a shop, moveable member 23 may be unlocked and folded back with respect to attachment member 21.

In the preferred embodiment, truck 11 does not include means for moving moveable member 23 with respect to attachment member 21. Rather, moveable member 23 is moved to its retracted position by means of an external crane or the like. However, those skilled in the art will recognize that suitable mechanical or hydraulic means could be provided to make moveable member 23 self-retracting.

Figure 3:
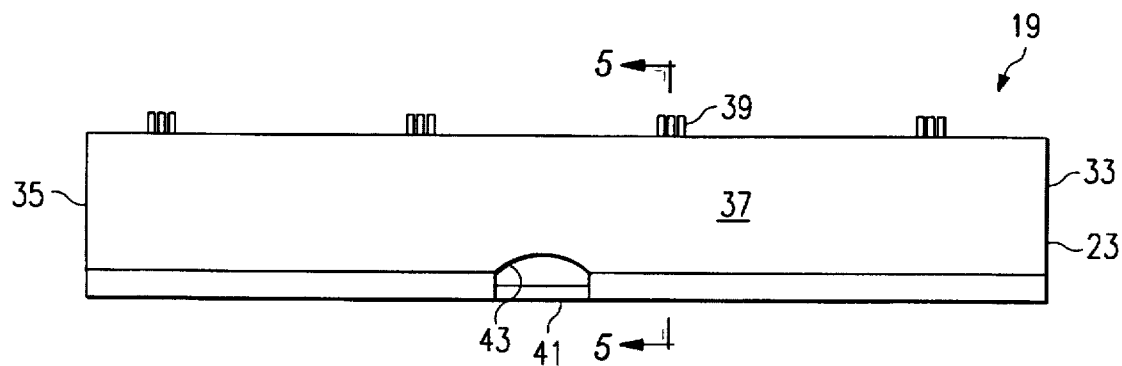
FIG. 3 is a front view of the canopy of the present invention.
Figure 4:
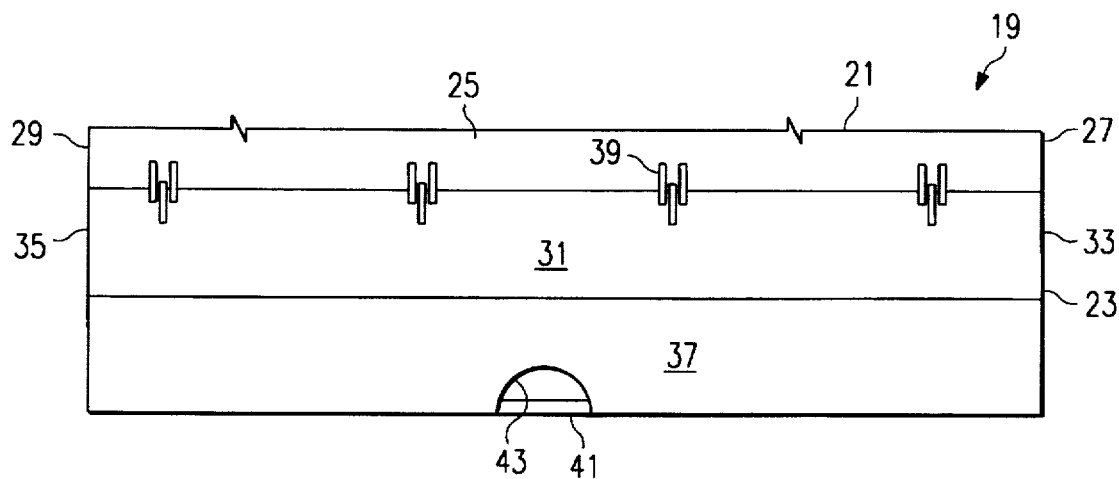
FIG. 4 is a top view of the canopy of the present invention.

Referring now to FIGS. 3 and 4, there are shown a front view and a top view, respectively, of canopy 19. As best shown in FIG. 4, attachment member 21 includes a top plate 25 connected between sides 27 and 29. Similarly, moveable member 23 includes a top plate 31 connected between sides 33 and 35. Moveable member 23 also includes a front plate 37 connected between sides 33 and 35 and sloping forwardly and downwardly from top plate 31. The downward and forward slope of front plate 37 allows material landing on canopy 19 to fall to the ground in front of truck 11.

Attachment member 21 and moveable member 23 are connected together by means of hinges, including a hinge 39. Since canopy 19 is of substantial width, four hinges 39 are included. However, those skilled in the art will recognize that more or fewer hinges may be included as a matter of design choice.

Moveable member 23 includes a lifting bar 41 positioned near the center of the forward end of front plate 37. A cutout 43 is formed in front plate 37 so as to provide access to lifting bar 41. A strap or the like may be attached to lifting bar 41 so that moveable member 23 may be lifted to the retracted position.

Referring now to FIG. 5, there is shown a sectional view taken generally along line 5—5 of FIG. 3. Attachment member 21 includes a front plate 45 connected between top plate 25 and the sides of attachment member 21, including side 29. Similarly, moveable member 23 includes a back plate 47 connected between top plate 31 and the sides of moveable member 23, including side 35. In the extended position, as shown in FIG. 5, back plate 47 of moveable member 23 engages front plate 45 of attachment member 21. Back plate 47 and front plate 45 are releasably locked together by means of a tapered dowel assembly, designated generally by the numeral 49. In the preferred embodiment, four releasable dowel assemblies are provided; however, those skilled in the art will recognize that more or fewer releasable dowel assemblies may be provided as a matter of design choice.

Figure 6:
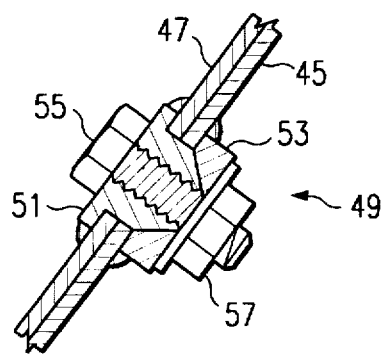
FIG. 6 is detail view of the releasable locking means of the present invention.

Referring to FIG. 6, there is shown a detailed view of the tapered dowel assembly according to the present invention. Each of plates 45 and 47 has formed therein a hole. A male member 51 having a tapered end is inserted into the hole of plate 47 and fixed in place by welding or the like. A similarly tapered annular female member 53 is fixed by welding or the like around the hole in plate 45. Male member 51 and female member 53 each include an axial bolt hole which accommodates a bolt 55. Male member 51 and female member 53 may thus be releasably locked together by the combination of bolt 55 and a nut 57. It will be noted in FIG. 6 that male member 51 and female 53 each include an inwardly facing shoulder that lock plates 47 and 45 therebetween. The cooperating tapers of male member 51 and female member 53 serve to align their respective bolt holes to accommodate small amounts of misalignment. As shown in FIG. 5, the bottom of canopy 19 is open to provide access to tapered dowel assembly 49.

Referring now to FIGS. 7 and 8, there is shown an alternative embodiment of the canopy of the present invention, which is designated generally by the numeral 61. Canopy 61 includes an attachment member 63 that is fixedly connected to body 17. A moveable member 65 comprises a pair of telescoping members 67 and 69 slidingly mounted for axial movement within attachment member 63. More particularly, a first telescoping member 67 is slidingly mounted in attachment member 63 and a second telescoping member 69 is sliding mounted in first telescoping member 67. Thus, telescoping members 67 and 69 may be pushed axially inwardly with respect to attachment member 63 to the position shown in FIG. 8.

Telescoping members 67 and 69 are normally held in the extended position by suitable locking means (not shown). Canopy 61 may be made self retracting by installing mechanical or hydraulic actuators inside canopy 61 for moving telescoping members 67 and 69 with respect to attachment member 63.

From the foregoing, those skilled in the art will recognize that the present invention is well adapted to overcome the shortcomings of the prior art. The canopy of the truck of the present invention protects the cab and forward part of the chassis during normal operation but does not interfere with overhead operations during servicing of the truck in a shop.

The present invention has been described and illustrated with reference to preferred embodiments. However, given the benefit of this disclosure, those skilled in the art will recognize that certain features and combinations of features may be used independently of other features and combinations of features. Accordingly, the spirit and scope of the invention is set out in the claims.

What is claimed is:

1. A truck, which comprises:
   a chassis;
   a cab mounted to the chassis;
   a body movably mounted to the chassis, said body being movable between a first position generally parallel to said chassis and a second generally upright position with respect to said chassis; and,
   a canopy movably mounted to said body, said canopy being movable between an extended position and a retracted position, said canopy extending outwardly of said body when said canopy is in said extended position to cover said cab when said body is in said first position, and said canopy being moveable upwardly and away from said cab to extend over a portion of said body in said retracted position.

2. The truck as claimed in claim 1, including means for locking the canopy in the extended position.

3. The truck as claimed in claim 1, wherein said canopy is hingedly mounted to said body.

4. The truck as claimed in claim 1, including means for preventing movement of said canopy toward said cab when said canopy is in said extended position.

5. The truck as claimed in claim 4, wherein said canopy includes:
   an attachment member fixedly mounted to said body, said attachment member including a pair of spaced apart sides with a front plate and a top plate connected therebetween; and,
   a movable member hingedly connected to s aid attachment member, said movable member including a pair of spaced apart sides with a back plate and a top plate connected therebetween, said back plate of said movable member engaging said front plate of said attachment member when said canopy is in said extended position.

6. The truck as claimed in claim 5, including means for releasably locking together said front plate of said attachment member and said back plate e of said movable member when said canopy is in said extended position.

7. The truck as claimed in claim 6, wherein said means for releasably locking together said front and back plates includes:
   a tapered male member attached to one of said front and back plates, said male member having a bolt hole axially formed therein;
   a tapered female member in the other of said front and back plates, said female member having a bolt hole axially formed therein, said male and female members matingly engaging each other when said canopy is in said extended position; and,
   a bolt connected through said bolt holes of said male and female members.

8. The truck as claimed in claim 5, wherein said movable member includes a forwardly and downwardly sloping front plate connected between said sides.

9. The truck as claimed in claim 4, wherein said canopy includes:
   an attachment member fixedly connected to said body, said attachment member including a pair of spaced apart sides with a top plate connected therebetween; and,
   a movable member movably mounted with respect to said attachment member, said movable member including a pair of spaced apart sides with a top plate connected therebetween.

10. The truck as claimed in claim 9, wherein said movable member includes a forwardly and downwardly sloping front plate connected between said sides of said movable member.

11. The truck as claimed in claim 9, wherein said movable member is hingedly mounted to said attachment member.

12. The truck as claimed in claim 11, wherein:
   said movable member includes a back plate connected between said movable member sides;
   said attachment member includes a front plate connected between said attachment member sides, said front plate of said attachment member engaging said back plate of said movable member when said canopy is in said extended position.

13. The truck as claimed in claim 12, including means for releasably locking together said front plate of said attachment member and said back plate of said movable member when said canopy is in said extended position.

14. The truck as claimed in claim 13, wherein said means for releasably locking together said front and back plates includes:
   a tapered male member attached to one of said front and back plates, said male member having a bolt hole axially formed therein;
   a tapered female member in the other of said front and back plates, said female member having a bolt hole axially formed therein, said male and female members matingly engaging each other when said canopy is in said extended position; and,
   a bolt connected through said bolt holes of said male and female members.

15. A canopy for shielding the cab and forward end of truck, said truck including a chassis and a body movably mounted to the chassis, said body being movable between a first position generally parallel to said chassis and a second generally upright position with respect to said chassis, said canopy comprising:
   an attachment member fixedly connectable to said body, said attachment member including a pair of spaced apart sides with a top plate connected therebetween; and,
   a movable member hingedly mounted with respect to said attachment member, said movable member including a pair of spaced apart sides with a top plate connected therebetween, said movable member including a back plate connected between said movable member sides, and said attachment member including a front plate connected between said attachment member sides, said front plate of said attachment member engaging said back plate of said movable member when said canopy is in said extended position.

16. The canopy as claimed in claim 15, wherein said movable member includes a forwardly and downwardly sloping front plate connected between said sides of said movable member.

17. The truck as claimed in claim 15, including means for releasably locking together said front plate of said attachment member and back plate of said movable member when said canopy is in said extended position.

18. The truck as claimed in claim 17, wherein said means for releasably locking together said front and back plates includes:
   a tapered male member attached to one of said front and back plates, said male member having a bolt hole axially formed therein;
   a tapered female member in the other of said front and back plates, said female member having a bolt hole axially formed therein, said male and female members matingly engaging each other when said canopy is in said extended position; and,
   a bolt connected through said bolt holes of said male and female members.

19. A truck, which comprises:
   a chassis;
   a cab mounted to the chassis;
   a body movably mounted to the chassis, said body being movable between a first position generally parallel to said chassis and a second generally upright position with respect to said chassis; and,
   a canopy movably mounted to said body, said canopy being movable between an extended position and a retracted position, said canopy extending outwardly of said body to cover said cab when said body is in said first position, said canopy including an attachment member fixedly connected to said body, said attachment member including a pair of spaced apart sides with a top plate connected therebetween, and said canopy including a movable member movably mounted with respect to said attachment member, said movable member including a pair of spaced apart sides with a top plate connected therebetween, wherein said movable member is telescopingly mounted with respect to said attachment member.

20. A canopy for shielding the cab and forward end of truck, said truck including a chassis and a body movably mounted to the chassis, said body being movable between a first position generally parallel to said chassis and a second generally upright position with respect to said chassis, said canopy comprising:
   an attachment member fixedly connectable to said body, said attachment member including a pair of spaced apart sides with a top plate connected therebetween; and,
   a movable member movably mounted with respect to said attachment member, said movable member including a pair of spaced apart sides with a top plate connected therebetween, wherein said movable member is telescopingly mounted with respect to said attachment member.

21. A truck body mountable on a chassis with a cab, said truck body being movable on said chassis between a first position generally parallel to said chassis and a second generally upright position with respect to said chassis, said truck body comprising:

a boxlike body structure;

an attachment member fixedly connected to said body structure, said attachment member including a pair of spaced apart sides with a top plate connected therebetween; and, a movable member movably mounted with respect to said attachment member, said movable member including a pair of spaced apart sides with a top plate connected therebetween, wherein said movable member is telescopingly mounted with respect to said attachment member.

22. A truck body mountable on a chassis with a cab, said truck body being movable between a first position generally parallel to said chassis and a second generally upright position with respect to said chassis, said truck body comprising:

a boxlike body structure;

an attachment member fixedly connected to said body structure, said attachment member including a pair of spaced apart sides with a top plate connected therebetween; and, a movable member hingedly mounted with respect to said attachment member, said movable member including a pair of spaced apart sides with a top plate connected therebetween, said movable member including a back plate connected between said movable member sides, and said attachment member including a front plate connected between said attachment member sides, said front plate of said attachment member engaging said back plate of said movable member when said canopy is in said extended position.

23. The truck body as claimed in claim 22, wherein said movable member includes a forwardly and downwardly sloping front plate connected between said sides of said movable member.

24. The truck body as claimed in claim 22, including means for releasably locking together said front plate of said attachment member and said back plate of said movable member when said canopy is in said extended position.

25. The truck body as claimed in claim 24, wherein said means for releasably locking together said front and back plates includes:

a tapered male member attached to one of said front and back plates, said male member having a bolt hole axially formed therein;

a tapered female member in the other of said front and back plates, said female member having a bolt hole axially formed therein, said male and female members matingly engaging each other when said canopy is in said extended position; and, a bolt connected through said bolt holes of said male and female members.

* * * * *